(12) United States Patent
Klimesch

(10) Patent No.: US 8,897,963 B2
(45) Date of Patent: Nov. 25, 2014

(54) METHOD FOR OPERATING A SENSOR DEVICE IN A VEHICLE, AND VEHICLE

(75) Inventor: Michael Klimesch, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/239,408

(22) PCT Filed: Jul. 5, 2012

(86) PCT No.: PCT/EP2012/002876
§ 371 (c)(1),
(2), (4) Date: Feb. 18, 2014

(87) PCT Pub. No.: WO2013/023723
PCT Pub. Date: Feb. 21, 2013

(65) Prior Publication Data
US 2014/0195111 A1 Jul. 10, 2014

(30) Foreign Application Priority Data
Aug. 18, 2011 (DE) .......................... 10 2011 111 070

(51) Int. Cl.
G06F 7/00 (2006.01)
G01K 3/06 (2006.01)
G01K 7/42 (2006.01)

(52) U.S. Cl.
CPC ..... *G01K 3/06* (2013.01); *G01K 7/42* (2013.01)
USPC ........................................................ 701/36

(58) Field of Classification Search
USPC ........................................................... 701/36
See application file for complete search history.

(56) References Cited

U.S. PATENT DOCUMENTS

| | | | |
|---|---|---|---|
| 2007/0010212 A1* | 1/2007 | Torimoto et al. ............... | 455/95 |
| 2007/0162197 A1* | 7/2007 | Fleming .......................... | 701/10 |
| 2009/0002225 A1* | 1/2009 | McBurney et al. ........ | 342/357.1 |
| 2009/0322606 A1* | 12/2009 | Gronemeyer ............ | 342/357.12 |
| 2010/0141524 A1* | 6/2010 | Imafuku et al. .......... | 342/357.15 |
| 2012/0313817 A1* | 12/2012 | Underbrink et al. ..... | 342/357.72 |
| 2013/0118341 A1* | 5/2013 | Brylev ........................... | 89/1.11 |

FOREIGN PATENT DOCUMENTS

| | | |
|---|---|---|
| DE | 4218034 | 12/1993 |
| DE | 19819817 | 11/1999 |
| DE | 10034499 | 1/2002 |
| DE | 10062655 | 7/2002 |

(Continued)

OTHER PUBLICATIONS

German Office Action for German Priority Patent Application No. 10 2011 111 070.8, issued Apr. 4, 2012, 6 pages.

(Continued)

Primary Examiner — Hussein A. Elchanti
(74) Attorney, Agent, or Firm — Staas & Halsey LLP

(57) ABSTRACT

A method operates a sensor device in a vehicle. In the method, signals from at least a sensor designed to register an outside temperature are processed. In addition, data that relates to a track located in front of the vehicle is processed. An evaluation of the signals is changed as a function of the data relating to the track. Herewith, it is possible to quickly display an abrupt fall in temperature, such as can be the case when travelling out of a tunnel, on a display belonging to the vehicle and to thus warn the driver of the vehicle in time. A vehicle has a control device that is designed to process signals from a temperature sensor and data that relates to the track located in front of the vehicle.

13 Claims, 1 Drawing Sheet

(56) References Cited

FOREIGN PATENT DOCUMENTS

| DE | 10343683 | 4/2005 |
| DE | 102005051539 | 9/2006 |
| DE | 102011111070.8 | 8/2011 |
| WO | PCT/EP2012/002876 | 7/2012 |

OTHER PUBLICATIONS

WIPO English Language Translation of International Preliminary Report on Patentability for PCT/EP2012/002876, downloaded from WIPO Website Feb. 18, 2014, 6 pages.

English Language International Search Report for PCT/EP2012/002876, mailed May 13, 2013, 2 pages.

* cited by examiner

METHOD FOR OPERATING A SENSOR DEVICE IN A VEHICLE, AND VEHICLE

CROSS REFERENCE TO RELATED APPLICATIONS

This application is based on and hereby claims priority to International Application No. PCT/EP2012/002876 filed on Jul. 5, 2012 and German Application No. 10 2011 111 070.8 filed on Aug. 18, 2011, the contents of which are hereby incorporated by reference.

BACKGROUND

The invention relates to a method for operating a sensor device in a vehicle in which signals of at least one sensor which is designed to register an outside temperature are processed. In addition, data relating to a route lying in front of the vehicle are processed. Furthermore, the invention relates to a vehicle having a control device and at least one temperature sensor.

DE 10 2005 051 539 A1 describes a method in which a navigation system makes available information about a bridge located in the direct vicinity of the motor vehicle. In fact, in winter the bridge represents a hazard because it can become iced up in corresponding weather. A control device determines the need for an intervention by a brake controller or a vehicle dynamics controller, wherein in addition information about the outside temperature which is acquired by a temperature sensor is taken into account. As an alternative to the intervention it is possible to output a warning to a driver of the motor vehicle.

The use of information relating to the route is also known from DE 103 43 683 A1, wherein information about bridges, tunnels, the conditions of the road, weather conditions and visibility conditions, the outside temperature and side wind conditions are taken into account here in order to determine the degree to which the driver of a vehicle is stressed. Depending on the stressing of the driver it is determined, if and which, operator control information, warning messages, messages or entertainment information, is/are output to the driver.

SUMMARY

One potential object is to provide a method for operating a sensor device and a vehicle of the generic type mentioned at the beginning which permits improved use of data relating to the route lying in front of the vehicle.

The inventor proposes a method for operating a sensor device changes an evaluation of the signals of the sensor, designed to register an outside temperature, as a function of the data relating to the route. This permits the evaluation of the data to be adapted to conditions of the route and therefore also to communicate abrupt changes in the outside temperature to a driver of the vehicle.

The data relating to the route lying in front of the vehicle are also referred to as predictive route data since they can contain, in particular, information which cannot yet even be registered visually by the driver of the vehicle. If these predictive route data are used during the evaluation of the signals of the temperature sensor, changes in the outside temperature which are otherwise considered to be interference variables can be taken into account as being caused by the conditions of the route and therefore not as interference variables but instead as actual changes in the outside temperature.

In one advantageous refinement, the smoothing of the signals is changed as a function of the data relating to the route. The smoothing decides in fact to what extent measured values which differ from a value which is to be output, for example a mean value, are taken into account in the formation of values. During the formation of the value which is to be output, measured values which are registered with the temperature sensor can be taken into account, in particular, in a weighted fashion.

Particularly strong smoothing or damping of the signals occurs, for example, when measured values are used to form mean values which have been acquired over a particularly long time interval. Specifically, individual atypical values of the measured values then do not play any particular role. If, on the other hand, a mean value is formed only from measured values registered within a short time interval and if an abrupt and strong change in the measured values occurs within this short time interval, this also affects the formation of the mean values. Damping or smoothing of the signals can be carried out, in particular, by suitable digital filters. For example, a damping constant of a filter which can be specified, in particular, in the unit of seconds can be shortened in order to bring about weaker smoothing of the signals, or lengthened in order to damp the signals strongly.

In a further advantageous refinement, smoothing of the signals is attenuated if the vehicle enters a section of the route in which the data make it possible to infer the presence of an outside temperature which is reduced compared to a preceding section of the route. If, in fact, the temperature sensor then registers a comparatively abrupt drop in temperature in the section with a reduced outside temperature, the small degree of smoothing of the signals of the sensor ensures that the output value which is formed from the measured values registered by the temperature sensor, in particular mean value, also represents this abrupt change in temperature. In this way it is ensured that by taking into account the predictive route data a sudden reduction in the outside temperature is not interpreted as being an interference variable and eliminated during the evaluation of the signals but instead is taken into account.

The smoothing of the signals can be attenuated, in particular, if the vehicle arrives at the end of a tunnel. Particularly in the case of a comparatively long tunnel it is specifically possible that there are very different outside temperatures present at the different ends of the tunnel. In the tunnel, a temperature which is largely independent of the air temperature outside the tunnel may be present, and which can therefore be higher than the air temperature outside the tunnel. In the case of cold weather at the end of the tunnel there can then be an abrupt temperature drop. This is also detected here as such through correspondingly weak smoothing of the signals of the temperature sensor. In an analogous fashion, a surprising rise in temperature at the end of the tunnel is detected as such and it can be correspondingly communicated to the driver in real time.

Additionally or alternative, the smoothing can be attenuated if the vehicle arrives at the start of a bridge or the start of a cutting through a forest region or at the start of a depression. On a bridge or in the region of a cutting it is in fact possible for weather conditions to be present which, owing to the exposed position, differ locally very strongly from the route section before the bridge or cutting. In particular, in the case of low outside temperatures and corresponding precipitation or in the case of high air humidity in the region of the bridge it is possible for ice to be formed. A similar situation can occur owing to the exposed position when traveling through a cutting. A comparable phenomenon may occur in a depression in which what is referred to as a pool of cold air can be located and which, under certain circumstances, then suddenly causes unfavorable road conditions. As a result of the relatively weak damping or smoothing of the signals on such routes, a possible temperature drop in the region of the bridge, cutting or depression can be registered particularly well.

It has also proven advantageous if the smoothing of the signals is boosted if the vehicle enters a section of the route in which the data make it possible to infer the presence of an outside temperature which is raised compared to a preceding section of the route. The outside temperature which is actually rising is then not in fact perceptible, or hardly perceptible, in the temperature indication which is communicated to the driver.

In particular, the smoothing of the signals can be boosted if the vehicle arrives at the start of a tunnel and/or while the vehicle drives through the tunnel. In a tunnel, there are in fact frequently comparatively uniform temperatures which are largely independent of the air temperatures outside the tunnel. A driver who is following the outside temperature which is rising in the tunnel can then be very particularly surprised if there are suddenly relatively low temperatures when he leaves the tunnel. On the other hand, if the temperature indication while he is driving through the tunnel already indicates comparatively low temperatures, such as are present in front of the tunnel, a possible temperature drop at the exit of the tunnel is less drastic and the driver is to a certain extent already prepared for the presence of low temperatures. In addition, the temperature drop at the exit of the tunnel can be indicated more quickly if the outside temperature indication remains comparatively constant during the journey through the tunnel.

The data which relate to the route lying in front of the vehicle are preferably made available by a navigation system of the vehicle. It is then specifically possible to take into account particularly well when the vehicle arrives in a section of the route in which an abrupt change in temperature is to be expected.

It is also proven advantageous if during the evaluation of the signals a temperature value is taken into account which is not measured with a sensor of the vehicle but instead with a sensor external to the vehicle. This temperature value is therefore transmitted to a control device of the vehicle from the outside. It is therefore possible, for example, to take into account the information that low outside temperatures are present at the other end of the tunnel. This is significant, in particular, when the low outside temperature is near to freezing point or below. If the presence of such an outside temperature, which is not measured with the temperature sensor of the vehicle, is communicated to the control device, for example by radio, which processes the data relating to the route and the signals of the sensor, the evaluation of the signals of the vehicle's own temperature sensor can be made dependent on the presence of this temperature value.

Finally, it has proven advantageous if a warning is output as soon as a data value which is acquired on the basis of the changed evaluation of the signals and which specifies the outside temperature is lower than a predetermined threshold value. The driver then does not need to keep an eye on the temperature indication but instead is particularly reliably, in particular visually and/or acoustically, informed about the low outside temperature. In this context, the predetermined threshold value, which can be, for example, 4° C., is preferably selected such that when the temperature drops below it, given corresponding weather conditions, it is possible to expect ice on the road.

The vehicle according to the invention comprises a control device and at least one temperature sensor whose signals can be transmitted to the control device. The control device is additionally designed to process data which relate to a route lying in front of the vehicle, and for this purpose to change an evaluation of the signals as a function of the data relating to the route. An outside temperature indication of the vehicle on which abrupt changes in the outside temperature can be displayed can then be actuated by the control device. Such abrupt changes in the outside temperature are evaluated here specifically by virtue of the fact that the data relating to the route are not taken into account as interference variables.

The advantages described for the method according to the invention and preferred embodiments also apply to the vehicle according to the invention.

The features and feature combinations specified above in the description and the features and feature combinations specified in the description of the figures below and/or shown solely in the figures can be used not only in the respectively specified combination but also in other combinations or alone without parting from the scope of the proposals.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
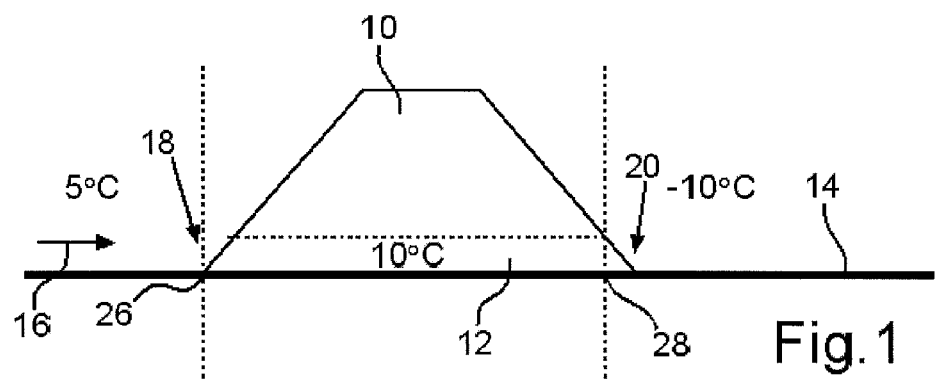
FIG. 1 is a schematic view of a route of a vehicle through a tunnel, wherein different outside temperature conditions are present at each end of the tunnel.

Reference will now be made in detail to the preferred embodiments of the present invention, examples of which are illustrated in the accompanying drawings, wherein like reference numerals refer to like elements throughout.

FIG. 1 is a schematic view of a mountain 10 with a tunnel 12 through the latter. A journey of a motor vehicle (not shown) on a route 14 leading through the tunnel 12 is illustrated by a movement arrow 16. An outside temperature of, for example, 5° C. is present on this side of the mountain 10 and therefore up to an entry 18 of the tunnel 12. In the tunnel 12 the outside temperature is higher, for example, 10° C. owing to the tunnel 12 being covered by the mountain 10. At an exit 20 of the tunnel 12 there is a very low outside temperature of −10° C. in the present example.

A control unit of the motor vehicle driving on the route 14 receives signals of a temperature sensor of the motor vehicle and processes the signals in order to display the outside temperature on a display. Interference variables are usually suppressed here so that the heat which passes from an engine block to the temperature sensor does not lead, for example in the stationary state of the motor vehicle, to a situation in which an increased outside temperature value is displayed on the display. In order to suppress such interference variables, the digital filters are used which damp or smooth the signals of the temperature sensor. However, this leads to a situation in which actual strong temperature fluctuations are not differentiated from interference variables which are to be suppressed. It is therefore possible, even in the event of a temperature drop such as occurs in the present example at the exit 20 of the tunnel 12, that there will be a slow change in the displayed temperature if predictive route data are not taken into account as described below.

Figure 2:
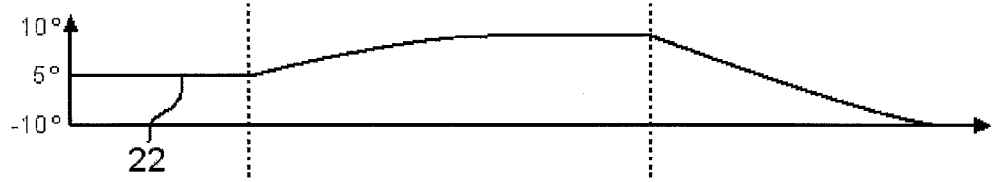
FIG. 2 shows the outside temperature values indicated on a display of the vehicle when the route is traveled along if no predictive route data are taken into account.

FIG. 2 illustrates, by a curve 22, how, without taking into account predictive route data, the temperature shown on the display rises slowly and subsequently drops again slowly from the point when the exit 20 of the tunnel 12 is reached while traveling through the tunnel 12. In the case of such a slowly reacting outside temperature display, it takes several minutes after the tunnel 12 has been exited until the displayed outside temperature corresponds to the temperature value which is actually present, this being −10° C. in the example. That is to say although there is a risk of the formation of ice on the route 14 when the tunnel 12 is exited, the driver is not warned correspondingly quickly that there is a risk of icing. Under certain circumstances, the driver therefore cannot react quickly enough to the weather conditions present on the other side of the tunnel 12.

The control device of the motor vehicle is therefore configured here to take into account predictive route data, that is to say data which relate to the route lying in front of the motor vehicle and to change the evaluation of the signals of the temperature sensor as a function of the predictive route data.

Figure 3:
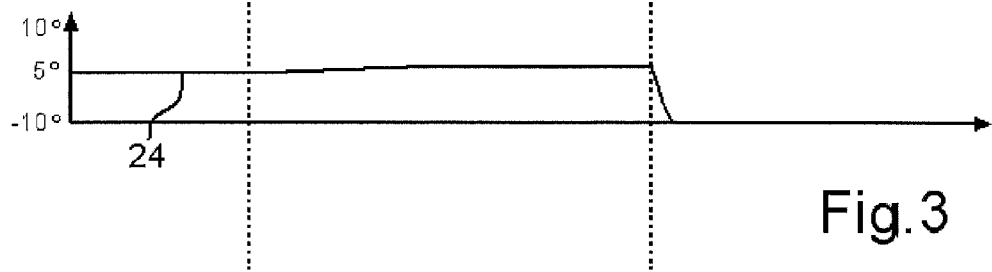
FIG. 3 shows the outside temperature values indicated on a display of the vehicle when the route is traveled along, taking into account predictive route data.

The result is shown in a curve 24 shown in FIG. 3. A navigation system of the motor vehicle transmits to the control device the information that the tunnel 12 starts at a point 26 of the route 14. Owing to the data which relate to the route 14, the signals of the temperature sensor are then suppressed either at the entry into the tunnel 12 or filtered more strongly so that particularly strong smoothing of the signals takes place. This leads to a situation that both at the entry 18 to the tunnel 12 and while the motor vehicle is driving through the tunnel 12 the displayed outside temperature does not rise, or at most hardly rises.

The navigation system also communicates to the control device that the tunnel 12 ends at a point 28 of the route 14. When the exit 20 of the tunnel 12 is reached, the smoothing of the signals is subsequently attenuated greatly for a short time. Weak filtering or weak damping of the raw values of the signal which is supplied by the temperature sensor therefore only takes place briefly. Correspondingly, the outside temperature display shows the actually present very low outside temperature of −10° C. in the example directly when the tunnel 12 is exited. The driver is then therefore warned very quickly that on this side of the tunnel 12 there are low outside temperatures which, given corresponding weather conditions, could involve the presence of ice on the route 14. The driver can therefore promptly adapt his speed to the weather conditions and road conditions which are possibly present.

The consideration of predictive route data, illustrated here in the example of a tunnel 12, during the evaluation of the signals of the temperature sensor can be applied in an analogous fashion when a bridge is driven over, when a cutting is reached or when a depression in which cold air is collected is entered.

In addition, temperature values determined by the control device in a different way than with the temperature sensor of the vehicle can be taken into account, for example temperature values which are the subject matter of a weather forecast.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for operating a sensor device in a vehicle, in which signals of a sensor, which is designed to register an outside temperature, and data relating to a route lying in front of the vehicle are processed, comprising:
    evaluating the signals as a function of the data relating to the route, such that a smoothing of the signals is changed as a function of the data relating to the route, wherein
    the smoothing of the signals is attenuated if the vehicle enters a section of the route for which the data relating to the route make it possible to infer that the outside temperature is reduced compared to the outside temperature of a preceding section of the route, and/or
    the smoothing of the signals is boosted if the vehicle enters a section of the route for which the data relating to the route make it possible to infer that the outside temperature is raised compared to the outside temperature of the preceding section of the route.

2. The method as claimed in claim 1, wherein
the smoothing of the signals is attenuated if the vehicle arrives at an end of a tunnel and/or at a start of a bridge and/or a cutting and/or a depression.

3. The method as claimed in claim 1, wherein
the smoothing of the signals is boosted if the vehicle arrives at a start of a tunnel and/or while the vehicle is driving through the tunnel.

4. The method as claimed in claim 1, wherein
the data relating to the route are made available by a navigation system of the vehicle.

5. The method as claimed in claim 1, wherein
the method further comprises receiving a remotely measured temperature value measured by a sensor external to the vehicle, and
the remotely measured temperature value is taken into account during the evaluation of the signals to predict a temperature of the route lying in front of the vehicle.

6. The method as claimed in claim 5, wherein the remotely measured temperature value is of a weather forecast.

7. The method as claimed in claim 1, wherein
the smoothing of the signals produces smoothed data values, and
the method further comprises outputting a warning if one or more of the smoothed data values specifies that the outside temperature is lower than a predetermined threshold value.

8. The method as claimed in claim 1, wherein the smoothing of the signals is changed so as to cause a temperature display of the vehicle to react to a temperature drop sensed by the temperature sensor more quickly than to a temperature rise, of the same magnitude as the temperature drop, sensed by the temperature sensor.

9. The method as claimed in claim 1, wherein the smoothing of the signals is attenuated if the vehicle enters a section of the route for which the data relating to the route make it possible to infer the outside temperature will be reduced compared to the outside temperature of a preceding section of the route.

10. The method as claimed in claim 1, wherein the smoothing of the signals is boosted if the vehicle enters a section of the route for which the data relating to the route make it possible to infer the outside temperature will be raised compared to the outside temperature of the preceding section of the route.

11. The method as claimed in claim 1, wherein
the smoothing of the signals is attenuated if the vehicle enters a section of the route for which the data relating to the route make it possible to infer the outside temperature will be reduced compared to the outside temperature of a preceding section of the route, and
the smoothing of the signals is boosted if the vehicle enters a section of the route for which the data relating to the route make it possible to infer the outside temperature will be raised compared to the outside temperature of the preceding section of the route.

12. A vehicle comprising:
a temperature sensor whose signals can be transmitted; and
a control device to receive signals transmitted from the temperature sensor and to, process data relating to a route lying in front of the vehicle, the control device configured to:
  change an evaluation of the signals as a function of the data relating to the route, and
  change smoothing of the signals as a function of the data relating to the route, and, in changing the smoothing of the signals:
    to attenuate the smoothing of the signals if the vehicle enters a section of the route for which the data relating to the route make it possible to infer that an outside temperature is reduced compared to a temperature of a preceding section of the route, and/or to boost the smoothing of the signals if the vehicle enters a section of the route for which the data relating to the route make it possible to infer that an outside temperature is raised compared to a temperature of a preceding section of the route.

13. The vehicle as claimed in claim 12, wherein the control device is configured to cause, by changing the smoothing of the signals, a temperature display in the vehicle to react to a temperature drop sensed by the temperature sensor more quickly than to a temperature rise, of the same magnitude as the temperature drop, sensed by the temperature sensor.

* * * * *